Oct. 29, 1929.  J. B. HOWE  1,733,225
MIXING AND BLENDING APPARATUS
Filed Oct. 12, 1925   8 Sheets-Sheet 2

Inventor:
Joseph B. Howe.
by Roberts Roberts & Cushman
attys.

Oct. 29, 1929.  J. B. HOWE  1,733,225
MIXING AND BLENDING APPARATUS
Filed Oct. 12, 1925  8 Sheets-Sheet 4

Inventor:
Joseph B. Howe.
by Roberts, Roberts & Cushman
attys.

Patented Oct. 29, 1929

1,733,225

UNITED STATES PATENT OFFICE

JOSEPH B. HOWE, OF WORCESTER, MASSACHUSETTS, ASSIGNOR TO GEORGE S. HARWOOD & SON, OF WORCESTER, MASSACHUSETTS, A CORPORATION OF MASSACHUSETTS

MIXING AND BLENDING APPARATUS

Application filed October 12, 1925. Serial No. 62,072.

This invention pertains to automatic mixing and blending apparatus adapted automatically to produce blends or mixtures of material from a plurality of sources of supply in predetermined proportions by weight, and is herein illustrated by way of specific example as embodied in apparatus for producing blends or mixtures of textile fibres preparatory to the manufacture of textile yarns or fabrics.

For the production of certain types of textile fabrics it is necessary to mix or blend two or more batches of fibre in order to obtain the requisite uniformity of color, feel, quality, etc. For example, mixtures of cotton fibre with wool, hair, silk, etc. are frequently employed, as well as mixtures of fibres of the same kind, for example wool, but of different staple, or which have received different preliminary treatments. Likewise fibres of the same or different kinds, but colored differently, are frequently mixed to produce intermediate shades or tones or to give mottled effects. Moreover even though the fibre employed is all of the same general kind, grade, and color, it is essential to the production of a uniform yarn that the fibre as received at the mill, whether in bales, sacks or other form of package, be thoroughly separated, beaten out, mixed and delivered to the carding machine at a uniform rate in order to produce roving and yarn of uniform character.

Usual methods for the hand blending of fibrous materials as employed in textile manufacture are slow, laborious, and inaccurate and at best do not attain fully to the desired results, while machine methods relying mainly upon the relative rate of operation of a plurality of machines or feeders are very unreliable due to the characteristics of the material operated upon.

The present invention has for its principal object the provision of automatic apparatus of commercial and practical capacity capable in an accurate manner of delivering fibrous material received from a plurality of independent supplies or sources to make a blend in which the proportion of fibre from each such supply or source is in accurate ratio by weight to the total quantity delivered.

Another object is to provide apparatus of the class described capable of adjustment to vary the proportion of fibre delivered from each of the several supplies or sources and which is substantially unlimited, in so far as the underlying principle of operation is concerned to the number of sources or supplies from which fibre may be received.

A further object is to provide control means of simple yet accurate character responsive to the operation of one of a series of weighing or feeding units and by such response determining the simultaneous delivery of material from a plurality of such units.

A further object of the invention is to provide means to insure the delivery of all of the several constituents of the blend at substantially the same instant of time so that separation of such constituents in passing through the subsequent operation or mechanism is substantially impossible.

In the accompanying drawings I have illustrated one preferred embodiment of the invention by way of example and in such drawings:

Fig. 8 is a fragmentary side elevation to large scale of a pattern mechanism which forms a part of the control unit illustrated in Figs. 4 and 5;

Fig. 13 is a fragmentary diametral section through the clutch shaft and parts shown in Fig. 12.

Figure 1:
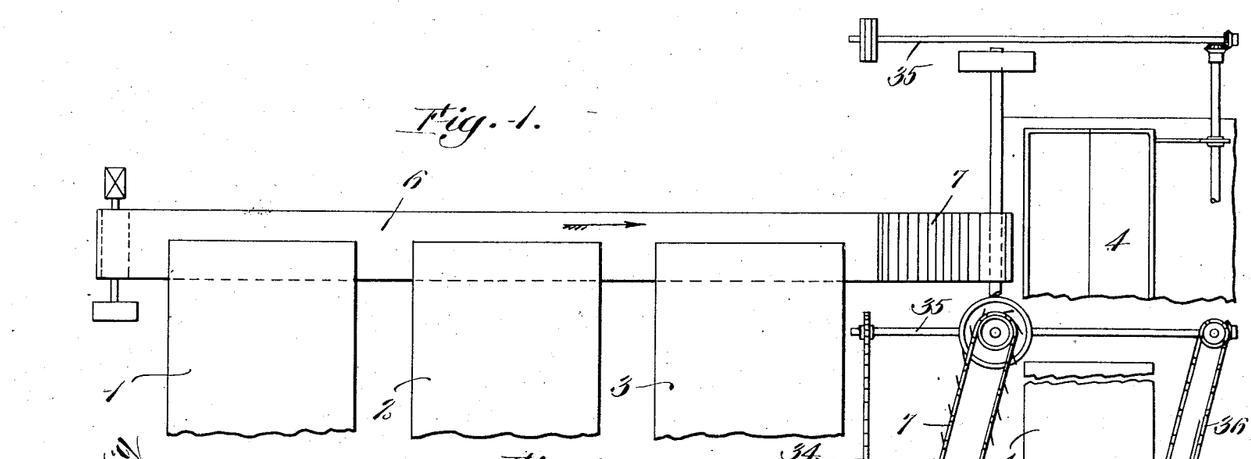
Fig. 1 is a fragmentary diagrammatic plan view of the complete apparatus.
Figure 2:
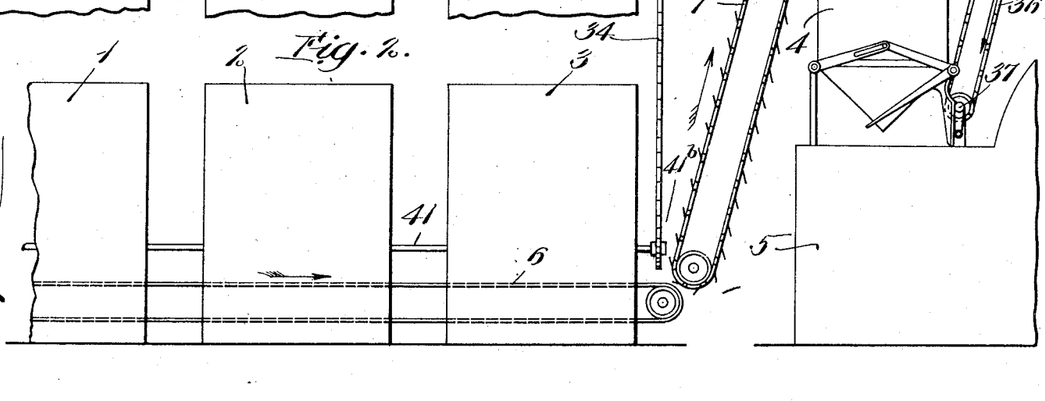
Fig. 2 is a diagrammatic side elevation of the apparatus as illustrated in Fig. 1.
Figure 3:
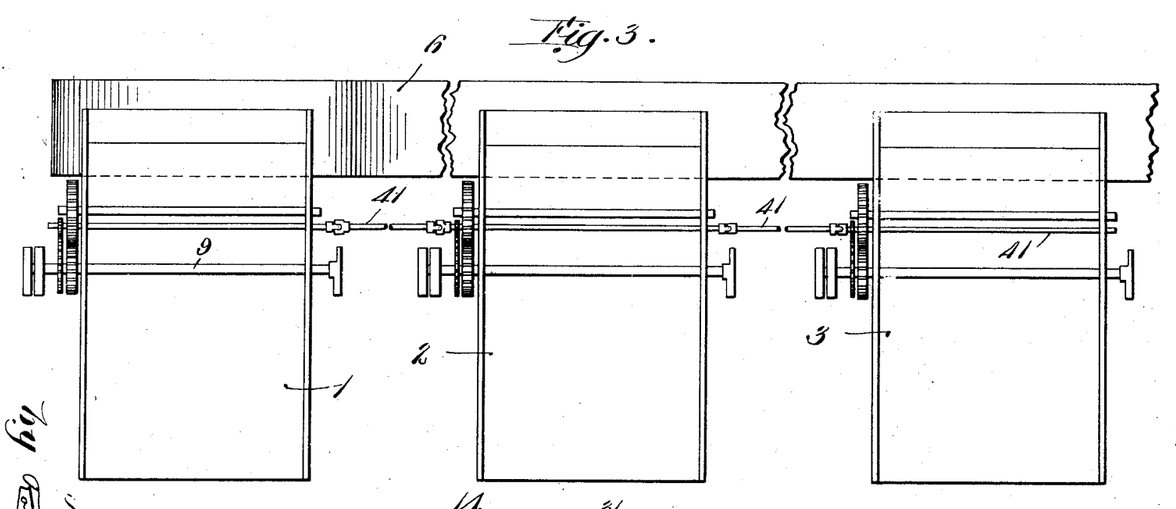
Fig. 3 is a fragmentary plan view of diagrammatic character to somewhat larger scale than Fig. 1 and showing the feeding and weighing units and the common conveyor for receiving the material discharged from the several units.

Referring to the drawings and more particularly to Figs. 1, 2 and 3, the numerals 1, 2 and 3 designate feeding and measuring units of which three are herein illustrated. It is to be understood however that a smaller or greater number may be employed as circumstances may warrant, the arrangement illustrated being adapted to blend material from three sources whereas if it be desired to blend material from a greater number of sources, additional units will be employed. The apparatus also comprises a receptacle or catch pan 4 which is conveniently disposed immediately above the supply bin of a machine 5, for example a card feeder of a type common in textile manufacturing establishments. While the catch pan 4 is here shown as directly associated with a card feeder, it is evident that this pan may be arranged to deliver its charge of material to any type of apparatus, for example to a belt conveyor for transferring it to a remote point or directly to a storage bin.

For conveying the material delivered by the several units 1, 2, 3, etc. to the catch pan, I prefer to provide a belt conveyor 6 so disposed that the material discharged from the several units 1, 2, 3, etc. falls directly thereupon and is conveyed thereby to a suitable elevating conveyor 7 which in turn delivers it into the top of the pan 4. Obviously other types of conveyor than those herein diagrammatically illustrated may be employed if desired.

One of the units, preferably, though not necessarily the end unit 1 is a control unit and will hereinafter be more specifically described. The other units, i. e. the units 2, 3, etc. are preferably of substantially the construction illustrated in the patent to Howe 1,531,944, March 31, 1925, except for such slight changes as will hereinafter be referred to.

The device of the patent to Howe 1,531,944 provides for elevating material from a bin and delivering such material into a scale pan which tilts when the pan has received a predetermined load. The tilting of the pan automatically stops the further feed of material to the pan and by means of suitable pattern mechanism the pan is then dumped, the scale pan is returned to its receiving position, and steadying means is brought temporarily into contact with the scale beam to damp oscillations of the latter as it returns to its normal position.

While I prefer to employ devices such as shown in the above patent, I contemplate that other feeding and weighing units may be substituted therefor if desired provided such weighing or feeding units are provided with dumping receptacles which may be opened positively by means of suitable mechanism. I further contemplate that the units 2, 3, etc. may constitute merely feed units so devised that the feed may be stopped intermittently by positively operated mechanism for predetermined periods of time. For example, the device shown in the patent to Howe 1,531,944, above referred to, may thus operate merely as a feed mechanism to feed material intermittently if the scale pan be removed or fixed in dumping position.

Figure 4:
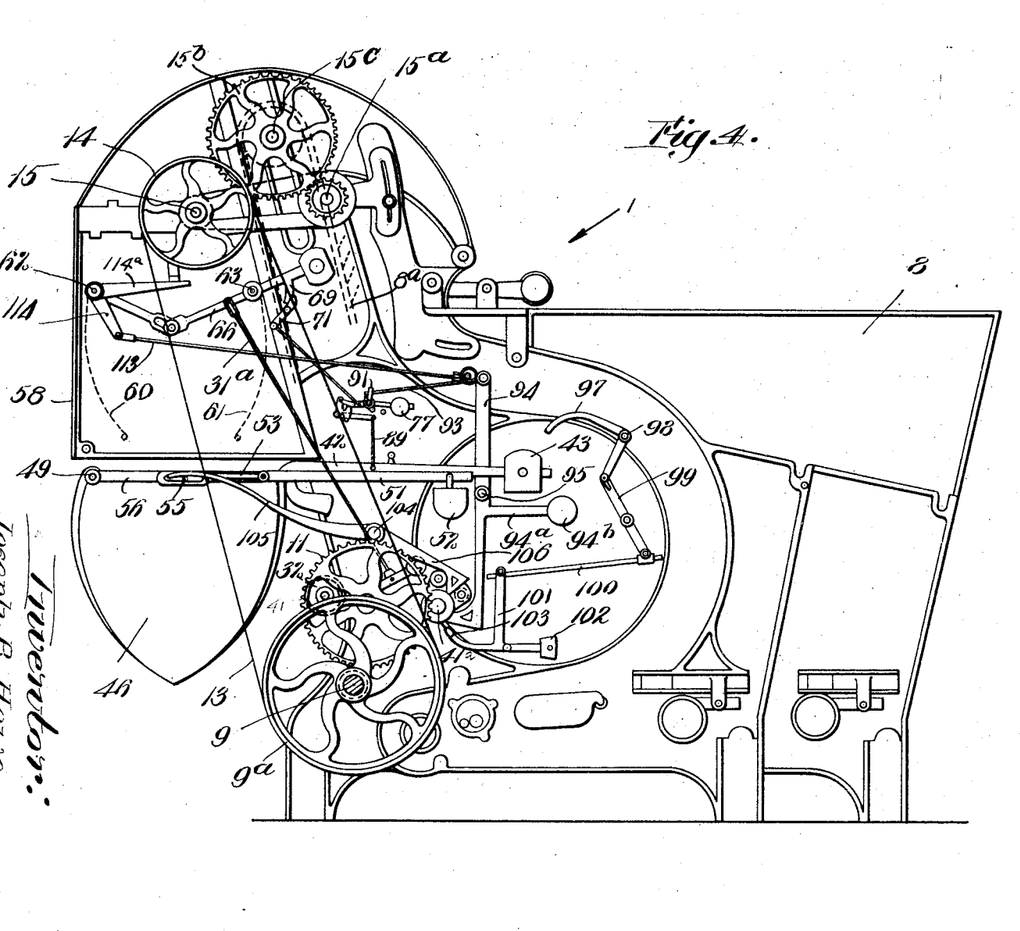
Fig. 4 is a side elevation of a control unit which may be one of the several units indicated in Fig. 3, showing the parts in position for feeding material to the weighing receptacle.
Figure 5:
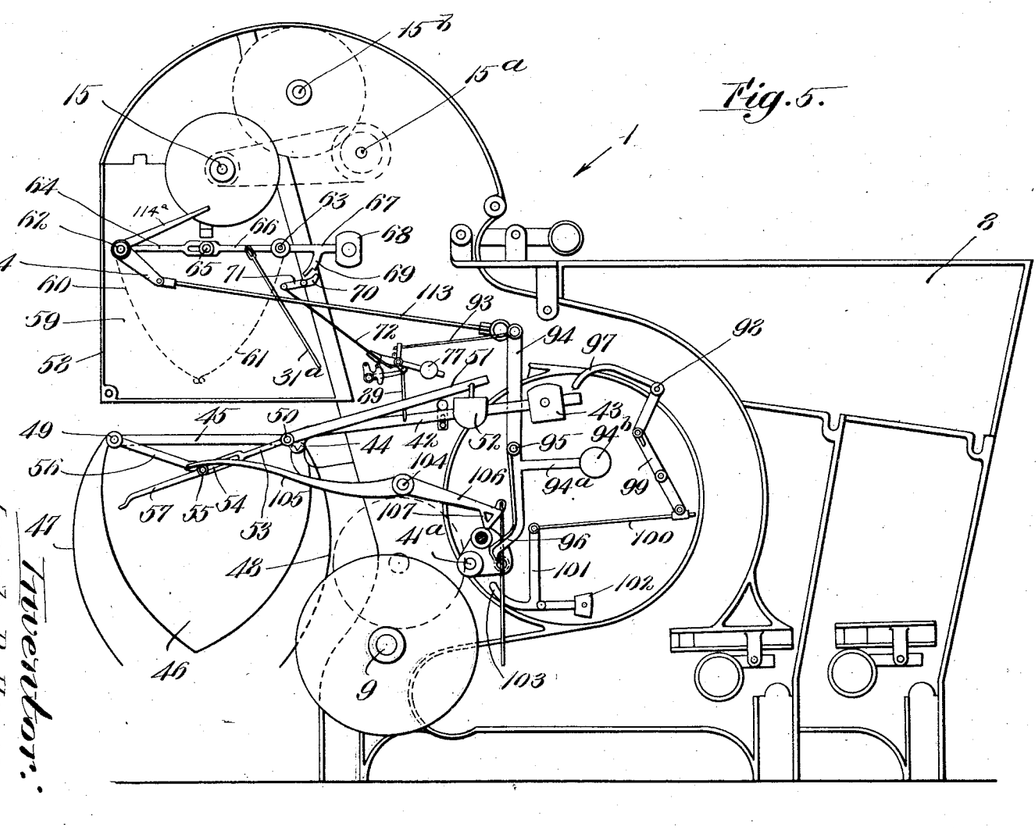
Fig. 5 is a view similar to Fig. 4, certain parts of the mechanism being omitted for the sake of clarity of illustration, and indicating the weighing receptacle as positioned to dump its load.

Referring now more particularly to Figs. 4 and 5, the control unit 1, which may in general resemble the structure shown in the above noted patent to Howe, preferably comprises a bin 8 for the reception of material, for example cotton or wool fibre, and an elevator or feed device such as the spiked apron $8^a$ which raises the material from the bin and delivers it at a desired point.

This unit is preferably provided with a drive shaft 9 having thereon suitable fast and loose pulleys for the reception of a belt for transmitting motion from any desired source. The other units are likewise provided with main drive shafts which may be driven from the same source as shaft 9.

The main shaft 9 is furnished with a pinion 10 (Fig. 8) which meshes with a gear 11 carried by a stud shaft 12 suitably supported by the machine frame. The shaft 9 may also carry a pulley $9^a$ (Fig. 4) which drives a belt 13 passing over a pulley 14 upon a shaft 15 near the upper part of the machine frame. The shaft 15 carries a suitable sprocket wheel connected by a sprocket chain to a sprocket wheel on a shaft $15^a$. This shaft is provided with a pinion meshing with a gear $15^b$ upon a shaft $15^c$ which extends lengthwise of the machine frame and which is provided with suitable drive means for the elevator chain $8^a$.

Any suitable means, not shown, such for example as an oscillating comb, may be employed for knocking off the fibrous material from the apron 8ª as the latter passes over the drive wheels or drums carried by the shaft 15ᶜ. Such oscillating combs being old in the art need not be further described in detail, it being sufficient to state that the material which is thus delivered from the upper end of the apron 8ª falls substantially in the vertical plane of the shaft 15.

Figure 12:
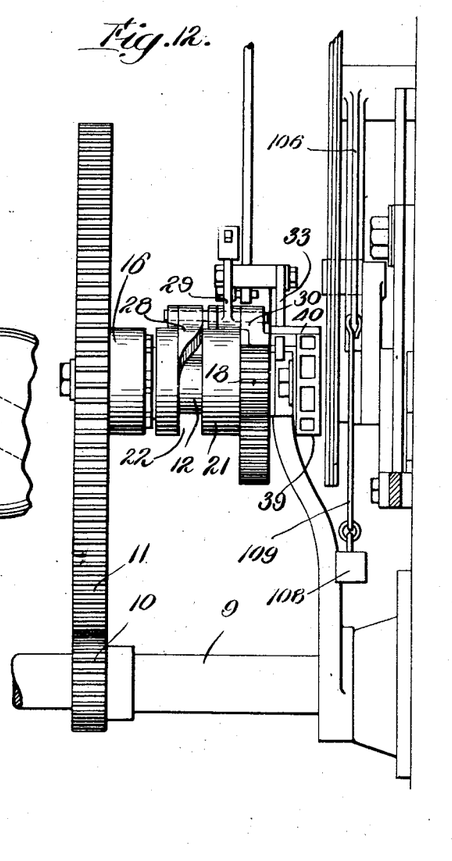
Fig. 12 is a fragmentary elevation partly in section showing details of a drive clutch mechanism for operating the pattern mechanism.
Figures 14, 15:
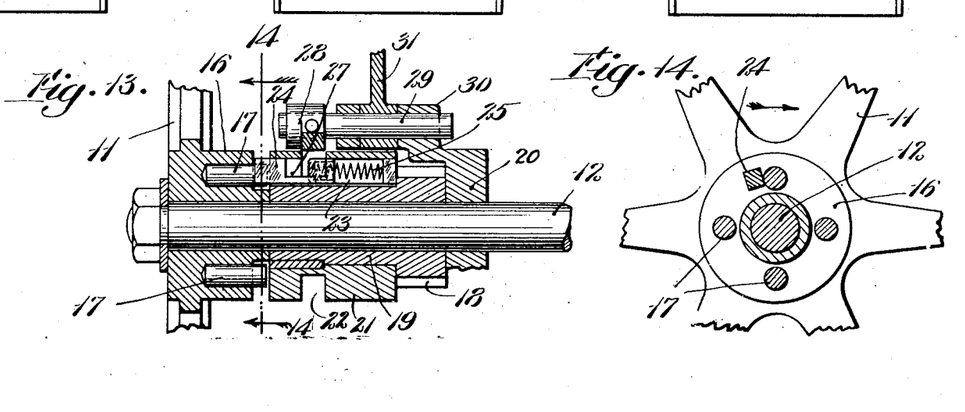
Fig. 14 is a fragmentary vertical section on the line 14—14 of Fig. 13.

Referring especially to Figs. 12, 13 and 14, the gear 11 is shown as provided with a hub 16 having a plurality of spaced pins 17 projecting from its inner face. A pinion 18 is mounted to turn freely upon the shaft 12 and this pinion is provided with an elongate hub 19, one end of which abuts against the central part of the hub 16 while the opposite end of the pinion bears against a part 20 of the frame. Upon the elongate hub 19 of the pinion 18 a sleeve 21 is mounted, the sleeve and pinion hub being suitably connected to prevent relative rotation.

The sleeve 21 is provided with a circumferential groove 22 and at a suitable point with an axially extending eccentric bore 23 which receives a sliding clutch dog 24 adapted to engage the projecting end of any of the pins 17 and thus to clutch the gear 11 to the sleeve 21, the dog 24 and the pins 17 constituting cooperative clutch elements.

A compression spring 25 seated in the bottom of the bore 23 tends to push the dog 24 to the left as viewed in Fig. 13 and into operative engaging relation to the projecting pins 17. The dog 24 is furnished with a recess 27 adapted to receive a wedge-like retractor finger 28 fixedly secured to a short shaft 29 mounted in bearings 30 carried by the machine frame. A clutch actuating arm 31 is fixed to the shaft 29 and this arm is provided at its free extremity with a counterweight 32ª (Fig. 8) which tends to turn the shaft 29 in a clockwise direction as viewed in said figure. Such movement of the shaft tends to swing the retractor finger 28 downwardly so that its end enters within the recess 27 in the dog 24 and thus as the sleeve 21 rotates the dog is gradually retracted by the wedge-like action of the finger 28. Normally the wedge finger 28 is so disposed that it retracts the dog 24, compressing the spring 25 and leaving the gear 11 free to rotate without turning the sleeve 21.

The arm 31 is furnished with a retaining finger or latch 33 which is adapted at times to engage a notch 34ª in the fixed part of the frame and thereby temporarily to hold the arm 31 in elevated position so that the wedge 28 is lifted from the recess 27, thus permitting the dog 24 to move into operative position. The chain 39 hereinafter described is provided with at least one pattern lug 40 which projects laterally across the plane of the retaining finger or latch 33, and during the progress of the chain this lug 40 will engage the latch or finger 33 and lift the latter from the notch 34ª, if it be seated therein, permitting the arm 31 to fall and restore the finger 28 to clutch disengaging position.

The pinion 18 meshes with a gear 32 fixed upon a shaft 41 which extends lengthwise of the unit 1 and is continued on as indicated in Figs. 1, 2 and 3 along the entire series of units, being provided at its remote end with a sprocket wheel 41ᵇ (Fig. 1). If desired the shaft 41 may be made in sections connected by universal or other flexible joints. The shaft 41, where it extends through the units 2, 3, etc. takes the place of and performs the function in said units of the shaft 41 shown in Patent No. 1,531,944 above referred to.

The sprocket wheel 41ᵇ is connected by a chain 39 to a suitable sprocket wheel upon a countershaft 35. The latter in turn is connected through gearing to a shaft carrying a sprocket chain 36 which drives a shaft 37 forming a part of the catch pan mechanism illustrated in Figs. 6 and 7 and which will hereinafter be further described.

That part of the shaft 41 which is journalled in the control unit is provided with a sprocket wheel 38 (Fig. 8) which drives a chain 39. This chain in turn drives a sprocket 40ª mounted upon a shaft 41ª carrying certain cam elements hereinafter referred to. This chain with the shaft 41ª and the cam elements is hereinafter referred to as a "pattern mechanism" since it controls the operation of various parts in a predetermined timed sequence in accordance with the arrangement of certain pattern indications, lugs, or cams.

Referring particularly to Figs. 4 and 5, the control unit 1 is shown as provided with a lever 42 fulcrumed at 44 and having a counterbalance weight 43 adjustably mounted upon its rear or right hand arm as viewed in Figs. 4 and 5. It is to be understood that the part 42 is duplicated at the opposite side of the machine and that these parts constitute what is hereinafter referred to as the scale beam. The forward or left-hand arms of the scale beam members 42, as viewed in Fig. 4, support a rigid frame 45 which carries a scale pan 46 comprising relatively fixed end members and pivotally supported bottom members 47 and 48.

The members 47 and 48 are secured to shafts 49 and 50 respectively, journalled in the frame 45. An arm 51 is fixedly secured to the shaft 50 and extends to the right of the shaft 50 as viewed in Figs. 4 and 5. This arm supports a counterweight 52 which tends to swing the arm in a clockwise direction. The shaft 50 is also provided with an arm 53 extending oppositely to the arm 51. The arm 53 is provided with an elongate slot 54 for the reception of a pin 55 projecting from the end of an arm 56 which is fixed to the shaft 49. The arm 53 also has an extension 57 whose free end is adapted to engage a projecting end of the shaft 49 thereby to limit upward swing of the arm 53.

The bottom members 47 and 48 are fixedly secured to the shafts 49 and 50, and the action of the weight 52, operating through the arms 53 and 56 is to hold the bottom members 47 and 48 in closed position with sufficient force to withstand the gravity pressure of the load which it is desired that the scale pan support.

The scale pan 46 is disposed directly below the point at which the material elevated by the apron 8$^a$ is delivered so that such material tends to fall into the scale pan. In accordance with the present construction the feed apron 8$^a$ of the control unit is in constant operation and would continuously deliver material to the scale pan unless such material were intercepted between the delivery point and the scale pan.

When the scale pan has received the desired predetermined load and has tilted downwardly under such load it is manifestly desirable to prevent additional material from entering the scale pan during the period in which the scale pan is being dumped and returned to normal position. For this purpose I provide a fixed intercepting pan or receptacle preferably having a frame 58 which may be comprised in the machine frame. The frame 58 forms or is provided with spaced fixed end walls constituting the ends of the interceptor pan. The bottom of the interceptor pan consists of a pair of swinging bottom members or leaves 60 and 61 respectively, preferably of the same general shape as the bottom members 47 and 48 of the scale pan. The members 60 and 61 are fixedly secured to shafts 62 and 63 suitably supported by the frame and the shaft 62 is furnished with an arm 64 having an elongate slot for a pin 65 projecting from the end of an arm 66 secured to the shaft 63. By this arrangement the movement of the shaft 63 produces simultaneous movement of the bottom members 61 and 62 in opposite directions.

Figure 9:
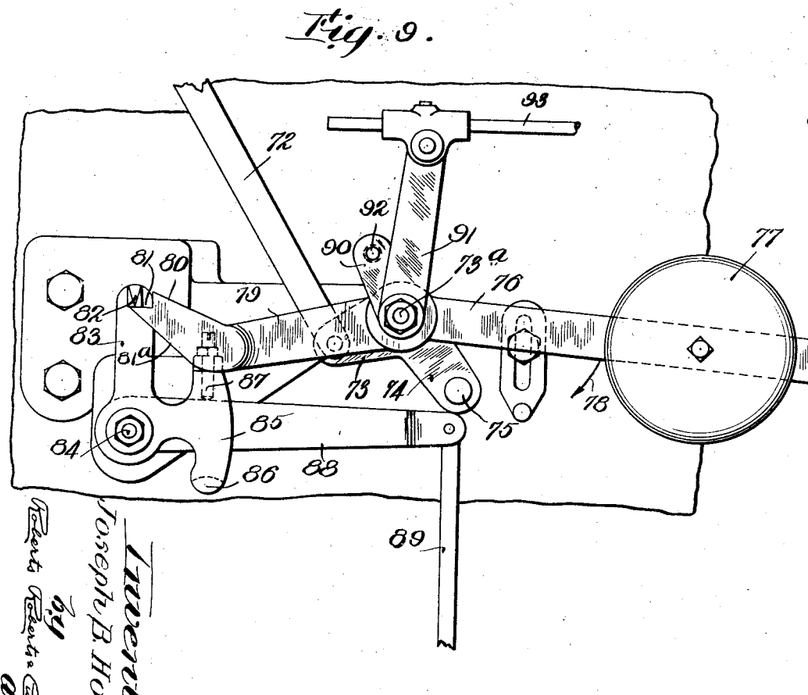
Fig. 9 is a fragmentary side elevation to large scale illustrating the details of construction of a latch releasing mechanism forming a part of the control unit.
Figure 10:
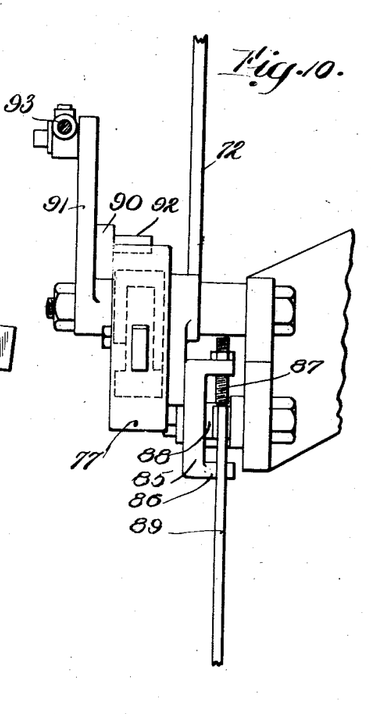
Fig. 10 is a fragmentary elevation at right angles to Fig. 9.

The shaft 63 is furnished with a fixed arm 67 which supports a counterweight 68 and carries an abutment finger 69. The counterweight 68 is of sufficient size so that it tends to turn the shaft 63 in a clockwise direction and thereby to swing the bottom members 60 and 61 toward each other to close the interceptor pan and prevent delivery of the material to the scale pan. The counterweight 68 is normally held in elevated position with the bottom members 60 and 61 of the interceptor pan separated as shown in Fig. 4 by means of a latch or dog 70 which engages the abutment finger 69 of the arm 67. The latch or dog 70 is provided with an arm 71 which is connected by a link 72 to one arm 73 (Fig. 9) of a bell crank lever supported upon a stub shaft 73$^a$ carried by the machine frame. This bell crank lever is provided with a second arm 74 having a projecting abutment pin 75 which is disposed in the vertical path of movement of a lever arm 76 also swinging upon the shaft 73$^a$. This lever arm 76 is provided with a heavy counterweight 77 which tends to swing it in the direction of the arrow 78, Fig. 9, and thereby to cause the arm 76 forcibly to engage the abutment pin 75 so as to turn the arm 73 in a clockwise direction, thus swinging the latch 70 to release the abutment member 69.

The arm 76 is normally held in elevated position by the following means. An arm 79 is rigidly connected to the arm 76, extending in the opposite direction from the latter, and is furnished with a finger 80 having an inclined cam surface 81$^a$ and having an abutment shoulder 81 at its extremity. A latch 82 is adapted to engage the abutment shoulder 81 and thus to prevent the arm 79 from swinging upwardly. The latch 82 is carried by one arm 83 of a bell crank lever pivoted upon a stub shaft 84 projecting from the machine frame, such bell crank having a second arm 85 provided with spaced stop members 86 and 87 respectively. The stop member 87 preferably consists of a threaded stud which may be adjusted to vary the distance between its end and the stop 86.

A lever 88 is pivoted to turn freely upon the shaft 84 and extends between the stops 86 and 87, some lost motion being provided between the lever and the stops. The lever 88 is connected by the link 89 to the scale beam 42 so that when the scale beam tips upwardly the arm 88 is engaged by the stop 87, thus swinging the arm 83 in a counterclockwise direction to release the latch 82 from the shoulder 81.

A lever member 90 mounted to turn freely upon the shaft 73$^a$ is provided with a projecting resetting pin 92 which overlies the arm 79. The member 90 also has an upwardly directed arm 91 whose free extremity is connected to a rod or link 93 pivotally secured at its other end to the upper end of a lever 94. The lever 94 is pivoted at 95 upon the machine frame and is furnished with a substantially horizontal arm 94$^a$ provided with a counterweight 94$^b$ which tends to swing the lever 94 in a clockwise direction. The lever 94 is provided with a downwardly directed arm which is furnished with a cam follower face 96 (Fig. 8).

In order to steady the scale beam 42 as the latter returns to its normal load-receiving position after the pan has been dumped, I provide a steadying finger 97 disposed in the vertical plane of movement of the free end of the scale beam 42, such finger constituting one arm of a bell crank lever pivoted at 98. The other arm of this lever is connected to a second lever 99 which in turn is connected at its lower end to one end of a link 100. The opposite end of the link 100 is pivotally secured to the upwardly extending arm 101 of a lever pivoted to the frame and provided with a counterweight 102 which tends to swing it in a clockwise direction. The lever 102 is furnished with an arm having a cam following finger 103 engageable by a cam element hereinafter described.

A stub shaft 104 projecting from the machine frame supports a lever having an arm 105 which overlies the projecting end of the pin 55 carried by the arm 56 on the shaft 49 of the scale pan. This lever also has an arm 106 which is furnished with a cam follower member 107. This end of the lever is also provided with a counterweight 108 supported by a cord or chain 109 which tends to swing the arm 105 in a clockwise direction away from the pin 55.

The shaft 41ª driven by the pattern chain 39 carries a cam-supporting member 110 provided on one face with a pin or roll 111 which is adapted successively to engage the cam members 107 and 96, above referred to. A second cam member or roll 112 projects from the other face of the cam carrier 110 and is adapted to engage the cam follower finger 103. The members 111 and 112 may be adjusted relatively to the member 110 to secure the proper timing of the parts.

The upper end of the lever 94 is connected by a second link 113 to an arm 114 of a bell crank lever turning freely on the shaft 62 of the interceptor pan. This bell crank has a second arm 114ª which is normally disposed above the pin 65. Thus when the lever 94 swings in a counter-clockwise direction, arm 114ª swings down and strikes pin 65 and positively opens the interceptor pan sufficiently to permit latch 70 to reengage abutment 69. The arm 66 mounted on shaft 63 of the interceptor pan is connected by a link 31ª to the clutch actuating arm 31, lost motion being provided between the upper end of link 31ª and arm 66.

Figure 6:
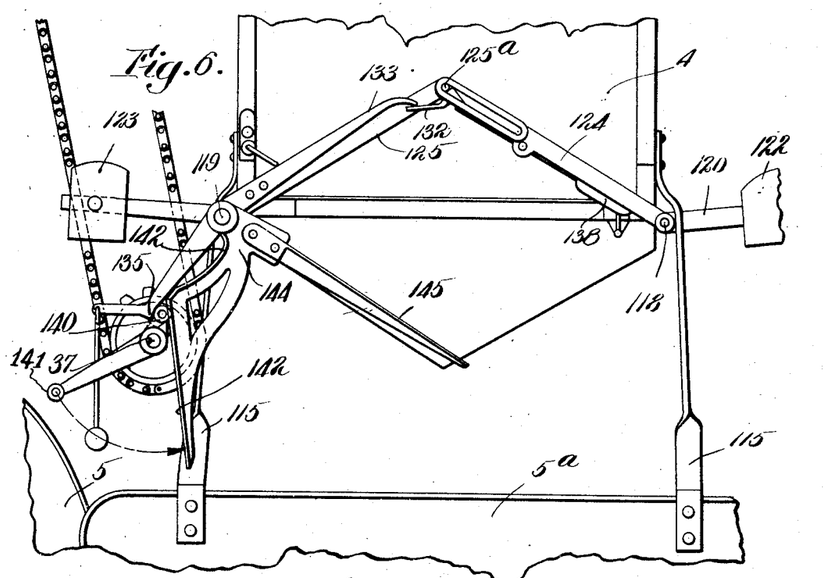
Fig. 6 is a fragmentary side elevation of a receiver or catch pan forming a part of the apparatus and to which the material from the several weighing units is conveyed, such pan being shown closed and in receiving position.
Figure 7:
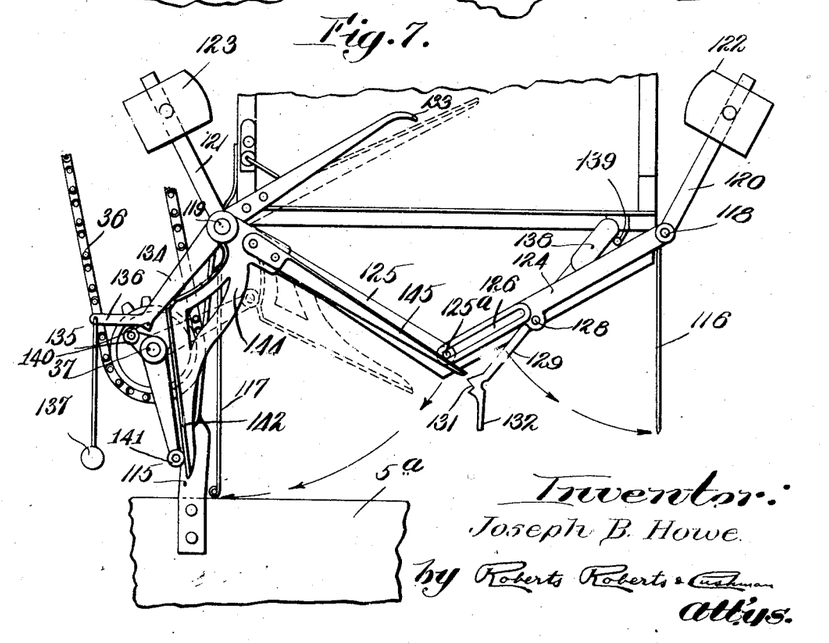
Fig. 7 is a view similar to Fig. 6 showing the pan in dumping position.

Referring particularly to Figs. 6 and 7, the catch pan 4 is supported by suitable legs 115 upon the bin 5ª of the card feeder 5 or other machine or appliance with which it is associated. This catch pan is provided with pivoted bottom members 116 and 117 secured to rotary shafts 118 and 119 respectively. The shafts 118 and 119 are provided with outwardly projecting arms 120 and 121 carrying counterweights 122 and 123 respectively, which tend to swing the shafts in such a direction as to close the bottom of the pan.

In order to insure simultaneous movement of the bottom members of the pan, the shafts 118 and 119 are also provided with arms 124 and 125 respectively. The arm 125 is furnished with a projecting pin 125ª which works in an elongate slot 126 in the free end of the arm 124.

In order positively to hold the bottom members of the catch pan in closed position until it is desired to dump the charge in the pan, one of the arms, for example the arm 124, is furnished with a pivot 128 upon which a latch lever 129 is mounted. This latch lever is provided with a notch 131 adjacent to its free extremity which is adapted to engage the pin 125ª when the catch pan is closed, and thus to lock the arms 124 and 125 against downward movement.

For releasing the latch the latter is furnished with a finger 132 engageable by the extremity 133 of a release lever pivoted to swing freely upon the shaft 119. This release lever is furnished with an arm 134 having a cam follower element 135. The arm 134 is also furnished with a projecting lug 136 which supports a counterweight 137 tending to hold the finger 133 in elevated position.

When the catch pan is open the latch 129 occupies the position shown in Fig. 7 and to prevent it from swinging from this position so that it will not thereafter reengage the pin 125ª when the pan is closed, I provide the latch with a counterweight 138 which drops into engagement with a fixed pin 139 when the pan opens.

The shaft 37 carries a short arm provided with a cam roll 140 which, as the shaft rotates, engages the cam follower member 135 and swings the latter upwardly thereby moving the release member 133 downwardly into engagement with the member 132, thus positively swinging the latch out of engagement with the pin 125ª and permitting the members 116 and 117 to separate by the gravity action of the charge within the pan.

In order to restore the members 116 and 117 to closed position, I provide the shaft 37 with a second arm having a cam roll 141 which is engageable with a cam follower member 142 forming a part of a lever 144 mounted to turn freely upon the shaft 119. This lever 144 has a second arm 145 disposed in the path of movement of the pin 125ª. Upon rotation of the shaft 37 and subsequent to the opening of the pan by the action of roll 140, the roll 141 engages the cam follower 142 and thereby elevates the arm 145. This arm engages the pin 125ª and swings the arms 124 and 125 upwardly until the pan is closed. As the pan closes the counterweight 138 swings the latch lever upwardly into operative engagement with the pin 125ª thus locking the pan bottom members in closed position.

Operation

Let it be assumed that each of the units 1, 2, 3, etc., is supplied with one of the materials which are to be associated to form the desired mixture or blend and that the main drive shafts of the several units are being driven continuously from a suitable source of power, and further that the conveyors 6 and 7 are being continuously moved in the proper direction, and the feeding devices of the several units, such for example as the spiked apron 8ª of the unit 1, are lifting material from the supply bins of the respective units and delivering such material at an elevated point where it may drop into the corresponding scale pan.

For the principal purpose for which the apparatus is designed, that is to say, for the mixing of different materials to form a blend, the scale beams of the several units are so counterbalanced that when the scale pan of any selected unit has received the desired weight of material to form its proportionate part of the mixture or blend, such scale pan will descend, and to secure the desired results the units 2, 3, etc., are arranged to weigh out those materials which are in smaller proportion in the mixture while the control unit 1 is designed to supply that material which forms the largest constituent of the desired mixture.

If it be assumed that the scale pans of the several units have just dumped their loads of material on to the conveyor 6 and that the scale beams have just been restored to their normal load-receiving position, the loads which have just been dumped onto the conveyor 6 are being moved by the latter along toward the elevator 7 and will eventually be dumped into the closed catch pan 4. The feed devices of the several units have also started to deliver their respective materials to the corresponding scale pans and after a certain period of operation the scale pans of the units 2, 3, etc., tilt downwardly under their predetermined loads and through the control mechanism more fully described in the patent to Howe 1,531,944, above referred to, the feed devices of these units are thereby stopped temporarily.

Since the scale pan 46 of the control unit is designed to receive the largest load of material the delivery of material to this unit continues, after that to the other pans has ceased, until ultimately the pan 46 tilts under its desired load. The tilting of the scale beam 42, acting through the link 89, releases the latch 82 from the shoulder 81 and thus permits the weight 77 to drop. The dropping of this weight brings the arm 76 forcibly into engagement with the abutment pin 75 and the momentum of the weight 77 acts to produce a blow upon the abutment sufficient to disengage the latch 70 from the abutment arm 69.

This permits the weight 68 to drop thereby immediately swinging the bottom members 60 and 61 of the interceptor pan into closed position so that the material which continues to be delivered by the spiked apron 8ª is caught in the interceptor pan and no longer drops into the scale pan.

The dropping of weight 68 elevates the arm 66 and thus moves the link 31ª upwardly, raising the clutch controlling arm 31 until the retaining finger or latch 33 engages the notch 34. The elevation of the arm 31 turns the shaft 29 and thus withdraws the clutch controlling wedge 28 from the recess 27, permitting the dog 24 to move into the operative position shown in Fig. 13, where it lies in the path of the pins 17 carried by the rotating hub of the gear 11. The pinion 18 is thus immediately set into rotation, turning the dumping shaft 41 by means of the gear 32, and at the same time starting the pattern mechanism comprising the chain 39 and the shaft 41ª upon its cycle of movement.

As the shaft 41ª turns, the cam member 111 (Fig. 8) first engages the cam follower 107 thus tilting the arm 106 upwardly and moving the arm 105 downwardly into engagement with the pin 55. This positive downward movement of the arm 105 swings the bottom members 47 and 48 of the pan outwardly so that the contents of the pan are discharged upon the belt 6. Since the shaft 41 or the continuations thereof extend through the entire series of units 2, 3, etc., and since in each of the several units 2 and 3 this shaft actuates a pan dumping device, the pans of all of the units are dumped simultaneously, provided the cam elements carried by the shaft 41 and the shaft 41ª are set properly. Moreover, since the shaft 41 drives the shaft 37 of the catch pan the bottom members 116 and 117 of the catch pan are opened simultaneously with the scale pans of the several units so that the contents of the catch pan are dumped at the same time that the several units dump their loads upon the conveyor 6.

The shaft 41 continues to rotate and through the mechanism more fully described in Patent 1,531,944, restores the scale pans of the units, 2, 3, etc. to their normal load-receiving position, steadies such scale beams as they reach load-receiving position, positively closes said pans, and starts the corresponding feed mechanism into operation. Likewise the continued rotation of the shaft 41 drives the shaft 37 and thereby positively closes the catch pan so that the latter is ready to receive the several batches of material just deposited upon the belt 6 by the several feed and weighing units. It is during the above operation and while the shaft 41 is turning that the cam member 112 comes into engagement with the cam follower finger 103 and swings this member and the parts connected therewith in proper timed relation to the return of the scale beam 42, under the action of its counterweight 43, so that as the beam reaches its load-receiving position the finger 97 comes down into contact with the end of the beam and steadies the latter and brings it positively to rest. Since the cam member 112 immediately disengages the finger 103 the weight restores the latter and the finger 97 to normal position and the finger 97 does not interfere with subsequent tilting of the scale beam.

Figure 11:
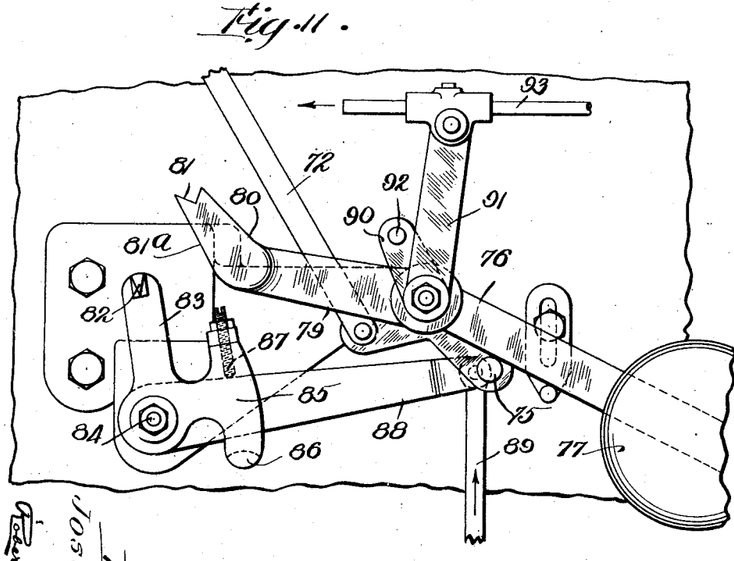
Fig. 11 is a view similar to Fig. 9 but showing the parts in latch releasing position.

The cam member 111 now engages the cam follower 96 and swings the lever 94 in a counterclockwise direction. This pushes the link 93 to the left as viewed in Figs. 5 and 11, thus swinging the lever arm 90 in a counterclockwise direction, causing the pin 92 to engage the arm 79 and thus swinging the latter downwardly and raising the weight 77. Since the downward swing of the scale beam 42 to normal position has already restored the arm 88 to the position shown in Fig. 9, the abutment shoulder 81 is free to engage the latch 82, the lost motion between the lever 88 and the stop 86 permitting the latch to tilt as the cam surface 81$^a$ of the finger 80 presses against the latch 82.

As the lever 94 is swung in a counterclockwise direction, as above described, it also moves the link 113 to the left as viewed in Fig. 5 swinging the arm 114$^a$ in a clockwise direction and thus positively opening the interceptor pan, permitting the material which has accumulated therein to drop into the scale pan, and reengaging latch 70 with abutment 69. If desired the cam followers 96 and 103 may be so set that the steadying finger 97 still engages the end of the scale beam when this accumulated load is dropped into the scale pan so that the fall of this relatively large mass of material will not cause the pan to tilt downwardly. As the interceptor pan is opened the weight 68 is lifted to its normal position and the latch 70 snaps under the abutment 69.

Immediately after the completion of the above sequence of operations, which substantially restores the parts to their initial position, the lug 40 carried by the pattern chain 39 engages the retaining finger 33 and disengages the latter from the holding notch 34. The counterweight 32 thereupon swings the arm 31 in a clockwise direction, this being permitted by reason of the fact that there is lost motion between the link 31$^a$ and the lever arm 66. The downward swing of the arm 31 turns the shaft 29 in a clockwise direction thus thrusting the cam wedge 28 into the recess 27 in the cam dog, retracting the latter and causing the pattern mechanism to come to rest. In accordance with the relative proportions of parts the chain 39 may be provided with one or more such pattern lugs 40 so that after each single revolution of the shafts 41 and 41$^a$ the retaining finger 33 will be released to bring such shafts to rest.

The machine now continues to operate following the above sequence of operations and when the scale pans of the several units are next dumped the batches of material previously dumped by them and carried by the conveyor into the catch pan are dumped from the latter in a single mass at the same time that the scale pans of the several units dump new batches of material upon the conveyor. The catch pan thus serves to accumulate the batches of material from each of the several units and to deliver the accumulated material as a single mass so that there is no danger that the several batches of material will become separated by arriving successively at the next stage of operation.

While the apparatus is as above stated particularly intended for making mixtures or blends of materials of different character in definite proportions by weight, it is also useful for mixing and unifying material of the same character or kind and for this purpose if desired the scale pans of the units 2, 3, etc., subsequent to the control unit may be removed or rendered inoperative. In such event the several units deliver batches of the same kind of material upon the conveyor and these batches are fed to the catch pan where they comingle and are dumped simultaneously. Thus the material delivered to the several units, although of the same general kind but possibly differing very slightly in shade, staple or other characteristic, is very thoroughly mixed and fed at a uniform rate to the catch pan from which the mingled batches of material are delivered simultaneously.

While the control unit herein disclosed is primarily intended for controlling the operation of units of more or less like character, it is useful as an independent mechanism, particularly as it provides means for weighing out material delivered by a continuously operated feed without danger of adding surplus material to the scale pan after the weighing has been accomplished.

Although the mechanism has herein been illustrated as applied to the textile arts and intended for handling fibrous textile material, I contemplate that the principle of operation is equally applicable to mechanism for weighing out material of other kind or character and that for such purpose it may only be necessary to change the type of feed or delivery means by which the material is dropped into the pan. I also contemplate that under some circumstances the feed mechanism may be dispensed with and the scale pans of the several units loaded by hand, in which event certain of the mechanical parts herein disclosed might be unnecessary. Obviously various changes in proportion of parts and arrangement of the same as well as in the number of feeding and weighing units employed may be made, and I further contemplate that under some conditions the catch pan may be dispensed with, although I prefer to employ this element of the apparatus.

I claim:

1. Apparatus for mixing and blending textile fibre comprising a plurality of sources of supply, independent receptacles for receiving material delivered from each such source, a power actuated drive shaft, and mechanical means actuated by the drive shaft and operative, whenever a selected one of said receptacles has received a predetermined quantity of material, for causing all of the receptacles immediately to discharge their contents and substantially at the same instant of time.

2. Apparatus for mixing and blending textile fibre comprising a plurality of sources of supply, means associated with each source of supply for automatically weighing a predetermined quantity of material from said supply, a power actuated drive shaft, and mechanical means actuable by the drive shaft in response to a selected one only of the several weighing means for causing all of the weighing means immediately to deliver their weighed out material at substantially the same instant of time.

3. Apparatus for mixing and blending textile fibre comprising a plurality of means for supplying material, means for automatically weighing out predetermined quantities of material from each supply, a power actuated drive shaft, and mechanical means actuable by said power shaft in response to the operation of one only of such weighing means for simultaneously delivering all of such weighed out material.

4. Apparatus for mixing and blending textile fibre comprising a plurality of receptacles, at least one of said receptacles moving from its normal position when a predetermined load of material has been placed therein, means for delivering material to each of said receptacles, a power actuated drive shaft, and mechanical means actuable by said power shaft in response to movement of said movable receptacle only under predetermined load, to cause all of the receptacles immediately to discharge their contents.

5. Apparatus for mixing and blending textile fibre comprising a plurality of units each having a dumping scale pan, one of said units being a control unit, a power actuated drive shaft, and mechanical means receiving motion from the drive shaft for dumping the scale pans of all of said units whenever the scale pan of the control unit contains a predetermined load irrespective of the loads in the other pans.

6. Apparatus for mixing and blending textile fibre comprising a plurality of dumping receptacles, a scale beam supporting one at least of said receptacles, means for delivering material to each of said receptacles, a power actuated drive shaft, and mechanical means actuable by the drive shaft whenever said scale beam tilts under a predetermined weight of material in its receptacle to dump all of said receptacles irrespective of the loads in said other receptacles.

7. Apparatus for mixing and blending textile fibre comprising a plurality of dumping scale pans, a scale beam supporting each pan, means for delivering material to each pan, a power actuated drive shaft, and mechanical means actuable by the drive shaft whenever a predetermined one of said scale beams tilts under a predetermined load in its pan for dumping all of the pans irrespective of the loads in the other pans.

8. Apparatus for mixing and blending fibrous material comprising a plurality of units each having weighing means and fibre feeding means, one of said units being a control unit, means for continuously driving the feeding means pertaining to the control unit and mechanical means actuable independently of the other units, when the weighing means of the control unit has received a predetermined weight of material, for simultaneously discharging the material weighed out by all of the units.

9. Apparatus for mixing and blending textile fibre comprising a plurality of dumping scale pans, one of said pans constituting a controller, means for delivering material into each of said pans, a power actuated drive shaft, means actuable by the drive shaft in response to movement of the controller pan, only, under predetermined load for dumping the several pans, and mechanical means actuable by movement of the other pan or pans under load for stopping the delivery of further material to such pan or pans.

10. Apparatus for mixing and blending textile fibre comprising a plurality of dumping scale pans, one pan being a control pan, a scale beam supporting each pan, means for delivering material to each pan, a power actuated drive shaft, means actuable by the drive shaft in response to tipping of the scale beam of the control pan only under a predetermined load in its pan for dumping all of the pans, and mechanical means actuable by tilting of at least one beam under predetermined load in its pan for stopping further delivery of material to that pan.

11. Apparatus for mixing and blending textile fibre comprising a pair of units each having a scale beam and a dumping scale pan supported thereby, one of said units being a control unit, the scale beam of the other unit being so counterbalanced as to tip under a load less than that necessary to tip the beam of the control unit, a power actuated drive shaft, and mechanical means actuated by the drive shaft in response to tipping of the beam of the control unit, only under load for dumping both scale pans simultaneously independently of the load in the other pan.

12. Apparatus for mixing and blending textile fibre comprising a plurality of units of which one is a control unit, each unit comprising a scale beam supporting a dumping scale pan, and means for feeding fibre to the several pans, the scale beams of all units other than the control unit being set to tip under loads less than that necessary to tip the scale beam of the control unit, a power actuated drive shaft and mechanical means actuated by the drive shaft in response to tilting of the scale beam of the control unit, only under load for dumping all of the scale pans.

13. Apparatus for mixing and blending textile fibre comprising a plurality of units each comprising a scale beam and a dumping scale pan supported thereby, one of said units being a control unit, means for feeding fibrous material to each of the scale pans, the scale beams of the units other than the control unit being set to tip under loads less than is belonging to units other than the control unit necessary to tip the beam of the control unit, means actuated by tilting of the scale beams for stopping the feed of material to the corresponding pans, a power actuated drive shaft, and mechanical means actuated by the drive shaft in response to tilting of the beam of the control unit only for dumping all of the scale pans.

14. Apparatus of the class described comprising a scale beam, a scale pan mounted thereon, feed means for dropping material into the pan, an interceptor pan disposed above the scale pan and below the delivery point of the feed means, said interceptor pan having a bottom comprising a pair of leaves hinged to turn about parallel axes, said leaves normally being separated to leave a free passage through the interceptor pan, means tending to swing said leaves about their pivots until their free edges substantially meet, thereby to close the bottom of the interceptor pan to catch the falling material, a latch normally restraining said leaf holding means, and means responsive to tilting of the scale beam for delivering a sudden blow to release the latch.

15. Apparatus of the class described comprising a scale beam, a scale pan mounted thereon, feed means for dropping material into the pan, an interceptor member intermediate the delivery point of the feed means and the scale pan, said interceptor normally being positioned out of the path of the falling material, means tending to move the interceptor into said path, a latch device normally restraining said latter means, and means actuable by tilting of the scale beam for delivering a sudden blow to release the latch device.

16. Apparatus of the class described comprising a scale beam, a scale pan, means for delivering material to the scale pan, a pivoted interceptor member for intercepting material on its way to the pan, a weight tending to move the interceptor into operative position, a retaining latch for holding the weight in elevated position, means tending to release said latch, and means actuated by the scale beam in tilting under load to render said latch releasing means operative thereby to cause the interceptor to move to operative position, and power actuated means for restoring the interceptor to normal inoperative position a predetermined time after tilting of the scale beam.

17. Apparatus of the class described comprising a scale beam, a scale pan mounted thereon, means for delivering material to the scale pan, a pivoted interceptor disposable in the path of the material for intercepting the latter on its way to the pan, a latch normally retaining said interceptor in inoperative position, an abutment member, means for transmitting movement from the abutment member to said latch, a weighted lever adapted when released to impart a blow to said abutment thereby to release said latch, means normally retaining said weighted lever in elevated position, and lost motion connections between the scale beam and said retaining means for releasing the latter when the scale beam tilts under load.

18. Apparatus of the class described comprising a scale beam, a scale pan mounted thereon, means for intercepting material on its way to the scale pan, a latch normally holding said intercepting means in inoperative position, a lever, means for transmitting movement from the lever to said latch, an abutment member projecting from said lever, a weighted lever arm engageable with said abutment thereby to release said latch, a releasable means normally holding said weighted arm in elevated position out of engagement with the abutment, means actuable by the scale beam in tilting under load to release said releasable means thereby permitting said weighted arm to drop and impart a blow to said abutment, and means operative thereafter for restoring said weighted arm to its normally elevated position.

19. Apparatus of the class described comprising a scale beam, a dumping scale pan supported thereby, means for delivering material to the scale pan, normally inoperative means comprising a pair of pivoted interceptors disposable in the path of the material to intercept the latter, means tending to move said interceptors to operative position, latch means normally preventing such movement, means actuable by the scale beam in tilting under load for delivering a sudden blow to release said latch means thereby permitting the interceptors to move to operative position, and power actuated means for restoring the interceptors to inoperative position.

20. Apparatus of the class described comprising a scale beam, a scale pan supported thereby, means for delivering material to the scale pan, an interceptor disposable in the path of the material to prevent it from entering the pan, a latch normally retaining the interceptor in inoperative position, an abutment member connected to the latch, means for imparting a blow to the abutment for disengaging the latch, secondary latch means normally retaining said blow imparting means in inoperative position, and lost motion connections between the scale beam and said secondary latch for releasing the latter when the scale beam tilts under a load.

21. Apparatus of the class described comprising a plurality of units each having a dumping scale pan and feeding means, one of said units being a control unit, the feeding means of the control unit operating continuously, a power actuated drive shaft, means actuable by the drive shaft when the scale pan of the control unit has received a predetermined weight of material for simultaneously dumping all of the scale pans, and means operative during dumping of the pan of the control unit to intercept material on its way from the feeding means to said pan.

22. Apparatus of the class described comprising a scale beam, a dumping scale pan mounted thereon, means for delivering material to the scale pan, a normally inoperative interceptor for intercepting material on its way to the scale pan, and actuating means set into operation by the scale beam in tilting under load successively to position the interceptor in operative position, to dump the scale pan, to steady the scale beam as the latter swings back to load-receiving position, and to return the interceptor to inoperative position, said means comprising a weight, rotating cams, and link and lever members actuable by the cams.

23. Apparatus for blending and mixing textile fibre comprising a scale beam, a pan carried thereby, a power driven mechanism including an endless pattern chain arranged to perform a cycle of operations and at the end of said cycle to stop, and mechanical means actuated by tilting of the scale beam under load to start said power driven mechanism upon its cycle.

24. Apparatus for blending and mixing textile fibre comprising a scale beam, a dumping scale pan supported thereby, means for feeding material to the pan, normally inoperative mechanism including an endless pattern chain for performing a single cycle of operations and then automatically stopping, said cycle including dumping the pan, and mechanical means actuable by tilting of the scale beam for starting said mechanism upon its cycle.

25. Apparatus for blending and mixing textile fibre comprising a scale beam, a dumping scale pan supported thereby, means for feeding material to the pan, normally inoperative mechanism including an endless pattern chain for performing a single cycle of operations and then stopping, said mechanism including means for dumping the scale pan and steadying the beam as the latter rises to load receiving position, and mechanical means actuable by tilting of the scale beam under load for initiating said cycle.

26. Apparatus for blending and mixing textile fibre comprising a scale beam, a pan carried thereby, means for delivering material to the pan, means for stopping the delivery of material to the pan, power driven means including an endless pattern chain for performing a cycle of operations with respect to the pan, beam, and delivery stop means, and then automatically stopping, and mechanical means operated by the tilting of the scale beam for starting said power driven means on its cycle.

27. Apparatus for blending and mixing textile fibre comprising a scale beam, a pan carried thereby, a pattern mechanism including an endless chain, means comprising normally disengaged clutch elements for driving the pattern mechanism, mechanical means actuated by tilting of the scale beam under predetermined load in the pan for engaging said clutch elements to start the pattern mechanism, and means for subsequently disengaging the clutch elements.

28. Apparatus for blending and mixing textile fibre comprising a scale beam, a pan carried thereby, a pattern mechanism including an endless chain, power driven means including normally disengaged clutch elements for driving said pattern mechanism, mechanical means actuated by tilting of the scale beam under load for engaging said clutch elements to start the pattern mechanism into operation, and means actuable by the pattern mechanism for again disengaging said clutch elements.

29. Apparatus for blending and mixing textile fibre comprising a scale beam, a pan carried thereby, a pattern mechanism including an endless chain, means comprising normally disengaged clutch elements for driving the pattern mechanism, means actuated by tilting of the scale beam under predetermined load in the pan for engaging said clutch elements to start the pattern mechanism, and a lug carried by the chain for causing said clutch elements to disengage after the chain has progressed a predetermined distance.

30. Apparatus of the class described comprising a scale beam, a pan carried thereby, a pattern mechanism including an endless chain, a shaft driven by the chain, clutch elements for driving the chain, a retractor normally holding the clutch elements out of engagement, means actuated by tilting of the beam under load for removing the retractor to inoperative position thereby permitting engagement of the clutch elements to drive the pattern mechanism, latch means for holding the retractor temporarily in inoperative position, and means actuated by the pattern mechanism at a predetermined point in the cycle of movement of the chain for releasing the latch means to cause the clutch elements to disengage.

31. Apparatus of the class described comprising a scale beam, a pan carried thereby, a pattern mechanism, means including engageable clutch elements for driving the pattern mechanism, a retractor for separating said clutch elements, a weight normally holding the retractor in operative position to separate the clutch elements, means actuated by tilting of the scale beam under load for lifting said weight and positioning the retractor to allow the clutch elements to engage and drive the pattern mechanism, a latch operative to retain said weight in its elevated position, and a pattern member forming part of the pattern mechanism engageable with said latch to move the latter and thereby permit the weight to drop, thereby moving the retractor to separate the clutch elements.

32. Apparatus of the class described comprising a scale beam, a pan carried thereby, a pattern mechanism, means including complemental clutch elements for driving the pattern mechanism, a retractor normally preventing engagement of said elements, means including lost motion connections actuable by tilting of the beam under load for withdrawing said retractor to permit said elements to engage, a latch for retaining said retractor in retracted position, means actuable by the pattern mechanism for disengaging the latch to permit the retractor to advance to separate the clutch elements, and means tending to advance the retractor.

33. Apparatus of the class described comprising a scale beam, a pan carried thereby, a pattern mechanism, means including engageable clutch elements for driving the pattern mechanism, means tending to engage said elements, a retractor for separating said elements, a lever arm secured to the retractor, a weight upon said arm tending to swing the arm and actuate the retractor to separate the clutch elements, means actuated by tilting of the scale beam for lifting said arm and weight thereby to withdraw the retractor and permit the clutch elements to engage, a latch finger pivotally secured to said arm and engaging a fixed abutment when the arm is raised whereby to hold the arm in its elevated position, and a pattern lug forming part of the pattern mechanism engageable with the latch finger to disengage it from the abutment and allow the arm to drop and restore the retractor to normal position.

34. Apparatus of the class described comprising a plurality of weighing devices, one of said devices being a control device, means for delivering material to each weighing device, means actuable by each weighing device to stop further delivery of material thereto when a predetermined quantity has been weighed out by it, a common, normally closed dumping receptacle for receiving material from the several weighing devices, means actuable by the control device for initiating delivery of all such weighed out material into said common receptacle, and means for dumping said receptacle at predetermined intervals.

35. Apparatus of the class described comprising a container, a conveyor delivering to said container, delivery means stationed at intervals along the conveyor for depositing batches of material thereon, and means for dumping the container when it has received a batch of material from each of said delivery means.

36. Apparatus of the class described comprising a container, a conveyor delivering to said container, means for depositing a predetermined number of batches of material upon the conveyor, and means for dumping the container when all of said batches of material have been deposited therein.

37. Apparatus of the class described comprising a container, a conveyor arranged to deliver material deposited thereon to the container, a plurality of weighing devices disposed at intervals along the conveyor, means for feeding material to the weighing devices, means for actuating each weighing device to dump a batch of material of predetermined weight upon the conveyor, and means for dumping the container when a batch of material from each weighing device has been deposited therein.

38. Apparatus of the class described comprising a plurality of dumping receptacles, means for delivering material to each receptacle, means stopping further delivery to any receptacle when said receptacle contains a predetermined load, common conveyor means for receiving the material from the several receptacles, a container to which the material is delivered by the conveyor, and means for dumping the container when it has received a load from each of said receptacles.

39. Apparatus of the class described comprising a plurality of units of which one is a control unit, each unit comprising a scale beam supporting a dumping scale pan, and means for feeding material to the several pans, the scale beams of all units other than the control unit being set to tip under loads less than that necessary to tip the scale beam of the control unit, a dumping catch pan, means for conveying material dumped from the scale pans of the several units to the catch pan, and means actuable by tilting of the scale beam under load for dumping all of the scale pans and the catch pan.

40. Apparatus for mixing and blending textile fibre comprising a conveyor, a plurality of dumping scale pans disposed at intervals along the conveyor, means for feeding textile fibre to each of the weighing devices, a power driven shaft, and means receiving power from said shaft for actuating each weighing device to dump a batch of material of predetermined weight upon the conveyor.

41. Apparatus for mixing and blending textile fibre comprising a plurality of dumping receptacles, means for feeding textile fibre to each receptacle, means for stopping further delivery of fibre to any receptacle when said receptacle contains a predetermined load, a conveyor, a power driven shaft, and means actuated by the power driven shaft for simultaneously dumping the several receptacles onto said conveyor.

42. Apparatus for weighing textile fibre comprising a scale beam, a scale pan mounted thereon, a spike apron for lifting fibre and dropping it into the pan, a pair of interceptor leaves swinging about spaced parallel axes, said leaves normally being separated to permit fibre to drop between them into the scale pan, an actuating arm connected to each leaf, a pin projecting from one arm into a slot in the other, a weight secured to one arm tending to swing the leaves into closed position to intercept fibre on the way to the scale pan, a pivoted latch normally holding said weight in elevated position, and means actuable by the scale beam when it tilts under load in the pan for releasing said latch.

43. Apparatus for weighing textile fibre comprising a scale beam, a scale pan mounted thereon, a spike apron for lifting fibre and dropping it into the pan, a pair of interceptor leaves swinging about spaced parallel axes, said leaves normally being separated to permit fibre to drop between them into the scale pan, an actuating arm connected to each leaf, a pin projecting from one arm into a slot in the other, a weight secured to one arm tending to swing the leaves into closed position to intercept fibre on the way to the scale pan, a pivoted latch normally holding said weight in elevated position, and means for releasing said latch, the latch releasing means comprising a source of stored up energy, and means actuated by tilting of the scale beam under load for releasing said stored up energy.

44. Apparatus for weighing textile fibre comprising a scale beam, a scale pan mounted thereon, a spike apron for lifting fibre and dropping it into the pan, a pair of interceptor leaves swinging about spaced parallel axes, said leaves normally being separated to permit fibre to drop between them into the scale pan, an actuating arm connected to each leaf, a pin projecting from one arm into a slot in the other, a weight secured to one arm tending to swing the leaves into closed position to intercept fibre on the way to the scale pan, a pivoted latch normally holding said weight in elevated position, and means for releasing said latch, the latch releasing means comprising a normally elevated weight, means normally holding said weight in elevated position, and means operating when the scale beam tilts under load to actuate said holding means thereby to allow the weight to drop.

Signed by me at Boston, Massachusetts, this 6th day of October, 1925.

JOSEPH B. HOWE.